US008073481B2

(12) United States Patent
Luo et al.

(10) Patent No.: US 8,073,481 B2
(45) Date of Patent: Dec. 6, 2011

(54) INTERFERENCE AND POWER CONTROL FOR WIRELESS COMMUNICATION (75) Inventors: Xiliang Luo, San Diego, CA (US); Durga Prasad Malladi, San Diego, CA (US); Xiaoxia Zhang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 1009 days.

(21) Appl. No.: 11/933,971

(22) Filed: Nov. 1, 2007

(65) Prior Publication Data

US 2008/0261645 A1 Oct. 23, 2008

Related U.S. Application Data (60) Provisional application No. 60/863,953, filed on Nov. 1, 2006, provisional application No. 60/888,995, filed on Feb. 9, 2007.

(51) Int. Cl.
*H04B 7/00* (2006.01)
(52) U.S. Cl. .... 455/522; 455/67.11; 455/69; 455/115.4; 455/115.1
(58) Field of Classification Search ............... 455/69, 455/522, 453, 436, 414.1, 4.3, 452, 442, 455/115.1, 67.11, 425, 4, 501, 438, 115.4, 455/220; 370/225, 252, 329, 330, 332, 333, 370/468, 425, 334, 400
See application file for complete search history.

(56) References Cited

U.S. PATENT DOCUMENTS

| 6,289,217 | B1 * | 9/2001 | Hamalainen et al. | 455/425 |
|---|---|---|---|---|
| 6,690,939 | B1 * | 2/2004 | Jonsson et al. | 455/453 |
| 7,266,385 | B2 * | 9/2007 | Koo et al. | 455/522 |
| 2003/0003921 | A1 * | 1/2003 | Laakso | 455/453 |
| 2004/0047324 | A1 * | 3/2004 | Diener | 370/338 |
| 2004/0095907 | A1 * | 5/2004 | Agee et al. | 370/334 |
| 2004/0157636 | A1 * | 8/2004 | Koo et al. | 455/522 |
| 2004/0166835 | A1 * | 8/2004 | Johansson et al. | 455/414.1 |
| 2006/0217141 | A1 * | 9/2006 | Legg et al. | 455/522 |

(Continued)

FOREIGN PATENT DOCUMENTS

WO WO2008048894 4/2008

(Continued)

OTHER PUBLICATIONS

3GPP TR 25.814 V 7.0.0 : "Physical Layer Aspects for Evolved UTRA" (Jun. 2006).

(Continued)

*Primary Examiner* — Tan Trinh
(74) *Attorney, Agent, or Firm* — Jimmy Cheng (57) ABSTRACT

Techniques for performing interference and power control in a wireless communication system are described. An asymmetric power control scheme adjusts the transmit power of a user equipment (UE) in an asymmetric manner, e.g., with different up and down step sizes. In one design, a parameter value may be determined based on received SINR of at least one Node B. Up and down steps may be determined based on the parameter value and may have different sizes. At least one overloading indicator from at least one neighbor Node B may be obtained. The transmit power of the UE may be adjusted based on the up and down steps and the at least one overloading indicator. For example, the transmit power may be increased by the up step if an overloading indicator from the strongest neighbor Node B is not received and may be decreased by the down step otherwise.

32 Claims, 9 Drawing Sheets

U.S. PATENT DOCUMENTS

| | | | |
|---|---|---|---|
| 2007/0147328 A1* | 6/2007 | Carlsson et al. | 370/342 |
| 2007/0197360 A1* | 8/2007 | Rester et al. | 482/907 |
| 2008/0254804 A1* | 10/2008 | Lohr et al. | 455/442 |
| 2008/0279257 A1* | 11/2008 | Vujcic et al. | 375/132 |
| 2010/0182903 A1* | 7/2010 | Palanki et al. | 370/225 |

FOREIGN PATENT DOCUMENTS

WO    WO2008097000 A1    8/2008

OTHER PUBLICATIONS

Qualcomm Europe, System Analysis for UL SIMO SC-FDMA, 3GPP TSG-RAN WG1 LTE 45, May 8, 2006-May 12, 2006, Shanghai, China R-061525.

3GPP TR 25.814 V7.1.0 (Sep. 2006) 3rd Generation Partnership Project; Technical Specification Group Radio Access Network; Physical layer aspects for evolved Universal Terrestrial Radio Access (UTRA) (Release 7), 3GPP-Standards, 2500 Wilson Boulevard, Suite 300, Arlington, Virginia 22201 USA, Sep. 1, 2006, XP040282759 see 9.3.2.4 (p. 100) t o 9.3.3.1 (p. 102).

3GPP TS 36.300 V9.0.0 (Jun. 2009), 3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 9).

* cited by examiner

INTERFERENCE AND POWER CONTROL FOR WIRELESS COMMUNICATION

The present application claims priority to provisional U.S. Application Ser. No. 60/863,953, entitled "INTERFERENCE AND POWER CONTROL FOR WIRELESS COMMUNICATION," filed Nov. 1, 2006 and U.S. Application Ser. No. 60/888,995, entitled "SYSTEM OPTIMIZATION VIA INTER-CELL POWER CONTROL WITH ASYMMETRIC STEP SIZES," filed Feb. 9, 2007, assigned to the assignee hereof and incorporated herein by reference.

BACKGROUND

I. Field

The present disclosure relates generally to communication, and more specifically to techniques for controlling the transmit power of a user equipment (UE).

II. Background

Wireless communication systems are widely deployed to provide various communication content such as voice, video, packet data, messaging, broadcast, etc. These wireless systems may be multiple-access systems capable of supporting multiple users by sharing the available system resources. Examples of such multiple-access systems include Code Division Multiple Access (CDMA) systems, Time Division Multiple Access (TDMA) systems, Frequency Division Multiple Access (FDMA) systems, Orthogonal FDMA (OFDMA) systems, and Single-Carrier FDMA (SC-FDMA) systems.

A wireless multiple-access communication system can communicate with multiple UEs on the downlink and uplink. The downlink (or forward link) refers to the communication link from the Node Bs to the UEs, and the uplink (or reverse link) refers to the communication link from the UEs to the Node Bs. Multiple UEs may simultaneously receive data on the downlink and/or transmit data on the uplink. This may be achieved by multiplexing the transmissions on each link to be orthogonal to one another in time, frequency and/or code domain. On the uplink, complete orthogonality, if achieved, results in the transmission from each UE not interfering with the transmissions from other UEs at a receiving Node B. However, complete orthogonality among the transmissions from different UEs is often not realized due to channel conditions, receiver imperfections, etc. The loss of orthogonality results in each UE causing some amount of interference to other UEs communicating with the same Node B. Furthermore, the transmissions from UEs communicating with different Node Bs are typically not orthogonal to one another. Thus, each UE may also cause interference to other UEs communicating with nearby Node Bs. The performance of each UE is degraded by the interference from other UEs in the system.

There is therefore a need in the art for techniques to control the transmit power of a UE to achieve good performance for that UE while reducing interference to other UEs.

SUMMARY

Techniques for performing interference and power control in a wireless communication system are described herein. In an aspect, an asymmetric power control scheme adjusts the transmit power of a UE in an asymmetric manner, e.g., using different up and down step sizes, different up and down adjustment probabilities, etc. This asymmetric power adjustment may allow for tradeoff between the performance of UEs with poor channel conditions versus cell throughput.

In one design of interference and power control, a parameter value may be determined based on signal-to-interference-and-noise ratio (SINR) or received power of a reference signal of at least one Node B. For example, the parameter value may be for the difference between an SINR of a serving Node B and an SINR of a strongest neighbor Node B for the UE. Up and down steps may be determined based on the parameter value and may have different sizes. For example, a larger up step size and a smaller down step size may be selected if the parameter value is greater than a threshold, or a smaller up step size and a larger down step size may be selected otherwise. At least one overloading indicator from at least one neighbor Node B may be obtained, e.g., from the serving and/or neighbor Node Bs. The transmit power of the UE may be adjusted based on the up and down steps and the at least one overloading indicator. For example, the transmit power may be increased by the up step if an overloading indicator from the strongest neighbor Node B is not received or decreased by the down step otherwise.

Various aspects and features of the disclosure are described in further detail below.

DETAILED DESCRIPTION

The techniques described herein may be used for various wireless communication systems such as CDMA, TDMA, FDMA, OFDMA, SC-FDMA and other systems. The terms "system" and "network" are often used interchangeably. A CDMA system may implement a radio technology such as Universal Terrestrial Radio Access (UTRA), cdma2000, etc. UTRA includes Wideband-CDMA (W-CDMA) and other variants of CDMA. cdma2000 covers IS-2000, IS-95 and IS-856 standards. A TDMA system may implement a radio technology such as Global System for Mobile Communications (GSM). An OFDMA system may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDM®, etc. UTRA, E-UTRA and GSM are part of Universal Mobile Telecommunication System (UMTS). 3GPP Long Term Evolution (LTE) is an upcoming release of UMTS that uses E-UTRA, which employs OFDMA on the downlink and SC-FDMA on the uplink. UTRA, E-UTRA, GSM, UMTS and LTE are described in documents from an organization named "3rd Generation Partnership Project" (3GPP). cdma2000 and UMB are described in documents from an organization named "3rd Generation Partnership Project 2" (3GPP2). These various radio technologies and standards are known in the art.

Figure 1:
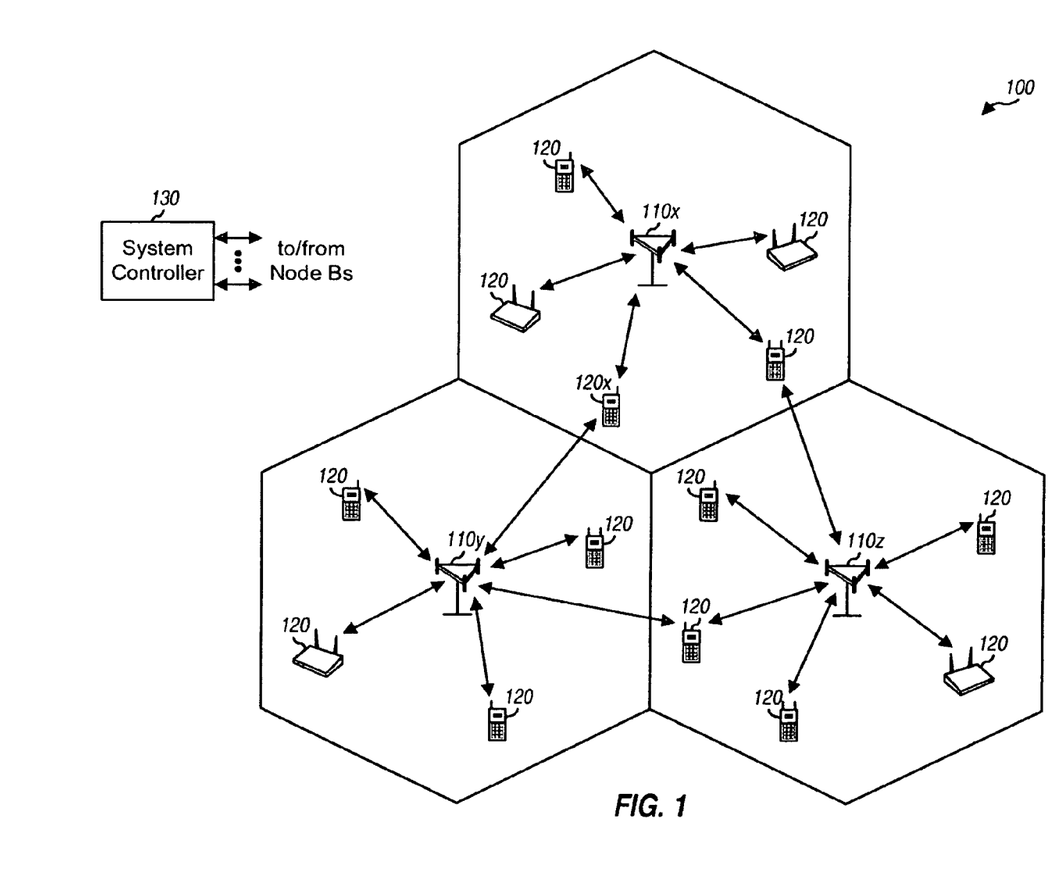
FIG. 1 shows a wireless communication system.

FIG. 1 shows a wireless communication system 100 with multiple Node Bs 110. A Node B may be a fixed station that communicates with the UEs and may also be referred to as an evolved Node B (eNB), a base station, an access point, etc. Each Node B 110 provides communication coverage for a particular geographic area. The overall coverage area of each Node B 110 may be partitioned into multiple (e.g., three) smaller areas. In 3GPP, the term "cell" can refer to the smallest coverage area of a Node B and/or a Node B subsystem serving this coverage area. In other systems, the term "sector" can refer to the smallest coverage area and/or the subsystem serving this coverage area. For clarity, 3GPP concept of cell is used in the description below.

UEs 120 may be dispersed throughout the system, and each UE may be stationary or mobile. A UE may also be referred to as a mobile station, a mobile equipment, a terminal, an access terminal, a subscriber unit, a station, etc. A UE may be a cellular phone, a personal digital assistant (PDA), a wireless modem, a wireless communication device, a handheld device, a laptop computer, a cordless phone, etc. A UE may communicate with zero, one, or multiple Node Bs on the downlink and/or uplink at any given moment. For a given link, a serving Node B is a Node B that is serving a UE on that link, and a neighbor Node B is a Node B that is not serving the UE on the link. The serving Node B for the downlink may or may not be the serving Node B for the uplink.

A system controller 130 may couple to Node Bs 110 and provide coordination and control for the Node Bs. System controller 130 may be a single network entity or a collection of network entities.

The system may employ a frequency reuse factor of one, which means that the same system bandwidth is used by adjacent cells. In this case, an uplink transmission from a given UE to a serving Node B may act as interference to the uplink transmissions from other UEs to other Node Bs. Each Node B may thus receive uplink transmissions from the UEs communicating with that Node B as well inter-cell interference due to uplink transmissions from other UEs communicating with other Node Bs.

The system may utilize OFDMA, SC-FDMA, and/or other multiple-access schemes. OFDMA utilizes orthogonal frequency division multiplexing (OFDM), and SC-FDMA utilizes single-carrier frequency division multiplexing (SC-FDM). OFDM and SC-FDM partition the system bandwidth into multiple (K) orthogonal subcarriers, which are also commonly referred to as tones, bins, etc. Each subcarrier may be modulated with data. In general, modulation symbols are sent in the frequency domain with OFDM and in the time domain with SC-FDM. If multiple subcarriers are used for transmission, then the transmit power of a UE may be evenly distributed across these multiple subcarriers. The transmit power used by the UE may then be given in terms of a power spectral density (PSD), which is transmit power per unit frequency, e.g., per subcarrier, per Hertz (Hz), etc.

Figure 2:
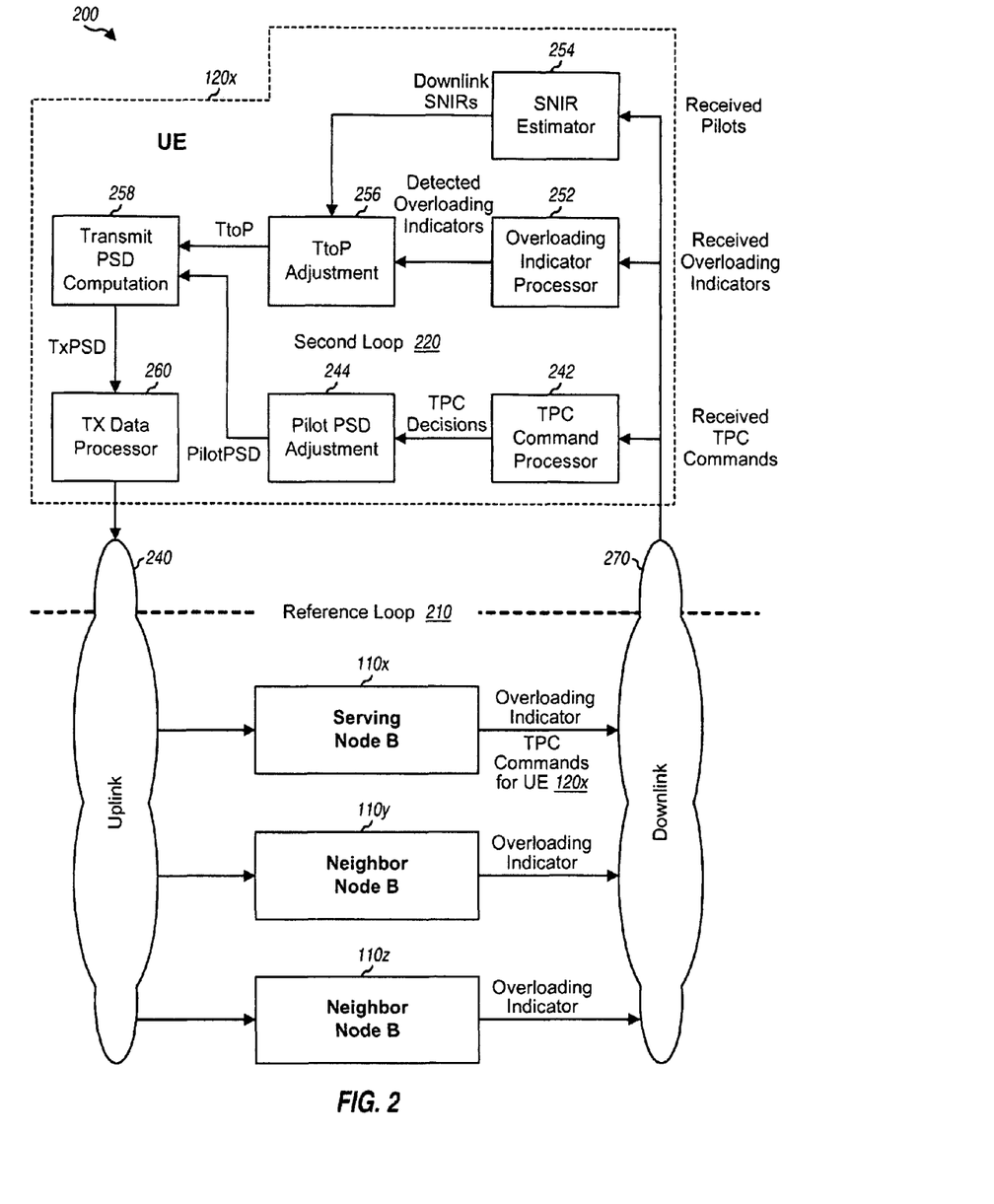
FIG. 2 shows a design of a power control mechanism.

FIG. 2 shows a design of an interference and power control mechanism 200 that may be used to control the transmit power of a UE 120x and the amount of interference caused by UE 120x to other UEs in other cells. Mechanism 200 adjusts the transmit power of UE 120x for uplink transmission.

UE 120x communicates with a serving Node B 110x on the uplink and may cause interference to neighbor Node Bs 110y and 110z. Power control mechanism 200 includes (1) a reference loop 210 that operates between UE 120x and serving Node B 110x and (2) a second loop 220 that operates between UE 120x and neighbor Node Bs 110y and 110z. Reference loop 210 performs intra-cell power control whereas second loop 220 performs inter-cell power control. Reference loop 210 and second loop 220 may operate concurrently but may be updated at different rates, e.g., with reference loop 210 being a faster loop than second loop 220. Reference loop 210 may operate without second loop 220, and second loop 220 may operate without reference loop 210. For simplicity, FIG. 2 shows only the portion of loops 210 and 220 residing at UE 120x.

Reference loop 210 adjusts a reference power level such that the received SINR measured at serving Node B 110x for UE 120x is as close as possible to a target SINR. In one design, the reference power level is given by a pilot PSD level. In general, the reference power level may be for any reference signal or channel. For reference loop 210, serving Node B 110x estimates the received SINR of a designated transmission from UE 120x, compares the received SINR against the target SINR, and generates transmit power control (TPC) commands based on the comparison results. Each TPC command may be either (1) an UP command to direct an increase in transmit power or (2) a DOWN command to direct a decrease in transmit power. Serving Node B 110x transmits the TPC commands on the downlink (cloud 270) to UE 120x.

At UE 120x, a TPC command processor 242 detects the TPC commands transmitted by serving Node B 110x and provides TPC decisions. Each TPC decision may be (1) an UP decision if a received TPC command is deemed to be an UP command or (2) a DOWN decision if the received TPC command is deemed to be an DOWN command. A pilot PSD adjustment unit 244 adjusts the pilot PSD based on the TPC decisions. Unit 244 may increase the pilot PSD by an up step for each UP decision and decrease the pilot PSD by a down step for each DOWN decision. A transmit PSD computation unit 258 computes a transmit PSD based on the pilot PSD from unit 244, a traffic-to-pilot ratio (TtoP) from a TtoP adjustment unit 256, and possibly other factors. The transmit PSD is a PSD that may be used by UE 120x for data transmission to serving Node B 110x. A transmit (TX) data processor 260 scales the uplink transmission to achieve the transmit PSD. UE 120x sends the uplink transmission to serving Node B 110x.

Due to path loss, fading, and multipath effects on the uplink (cloud 240), which typically vary over time and especially for a mobile UE, the received SINR for UE 120x continually fluctuates. Reference loop 210 attempts to maintain the received SINR for UE 120x at or near the target SINR in the presence of changes in the uplink channel conditions.

Second loop 220 adjusts the TtoP of UE 120x such that a transmit PSD level that is as high as possible may be used for uplink transmission while keeping inter-cell interference to within acceptable levels. For second loop 220, each neighbor Node B 110 receives uplink transmissions from UEs in other cells, estimates the inter-cell interference observed by that Node B from these UEs, and generates an overloading indicator based on the interference estimate. Each Node B may send its overloading indicator to UEs in the system. Each Node B may also send its overloading indicator to nearby Node Bs via a backhaul connection between these Node Bs. In general, a given Node B may send its overloading indicator and/or the overloading indicators from other Node Bs to the UEs within its coverage. For example, the Node B may receive overloading indicators from nearby Node Bs and may send these overloading indicators to the UEs served by that Node B. The Node B may send the overloading indicators via broadcast or unicast messages. UE 120x may thus receive the overloading indicators from neighbor Node Bs 110y and 110z via serving Node B 110x, neighbor Node B 110y and/or neighbor Node B 110z.

At UE 120x, an overloading indicator processor 252 receives the overloading indicators from the neighbor Node Bs and provides detected overloading indicators to TtoP adjustment unit 256. An SINR estimator 254 receives pilots from the serving and neighbor Node Bs, estimates the downlink SINR of each Node B, and provides the downlink SINRs for all Node Bs to unit 256. Unit 256 identifies the strongest neighbor Node B based on the downlink SINRs and further adjusts the TtoP based on the detected overloading indicators and the downlink SINRs, as described below.

FIG. 2 shows an example power control mechanism that may be used for interference and power control. Interference and power control may also be performed in other manners, e.g., with different loops and/or different parameters.

In one design for interference control, each Node B estimates the total received interference level due to UEs in other cells. Each Node B maintains an interference-over-thermal (IoT) threshold and compares the total received interference level against this IoT threshold. Each Node B sends an overloading indicator when the total received interference level exceeds the IoT threshold. In this design, the overloading indicator from each Node B indicates whether or not that Node B is overloaded, which occurs if the total received interference level exceeds the IoT threshold for that Node B.

In one design, each UE may monitor the overloading indicator from the strongest neighbor/non-serving Node B. In general, the strongest neighbor Node B may be determined based on various quantities such as downlink SINRs, channel gains, received pilot powers, pilot strengths, etc. These quantities may be measured by the UE for the neighbor Node Bs. In one design, the strongest neighbor Node B is determined based on downlink SINR. Each UE may lower its transmit PSD if an overloading indicator from the strongest neighbor Node B is received and may increase its transmit PSD otherwise.

In one design, a symmetric power control scheme uses the same adjustment step size for the transmit PSD. All UEs may perform the same up and down adjustment operations using this step size. Pseudo code for transmit PSD adjustment for a given UE in accordance with the symmetric power control scheme may be as follows:

```
10      if (BS1 is overloaded)
20          TtoP = TtoP − Δ;
30      else
40          TtoP = TtoP + Δ;
50      end if
60      if (TtoP > maxTtoP) TtoP = maxTtoP;
70      if (TtoP < minTtoP) TtoP = minTtoP;
80      TxPSD = PilotPSD + TtoP;
``` where
BS0 is the serving Node B,
BS1 is the strongest neighbor Node B,
Δ is a step size for PSD adjustment,
TxPSD is the transmit power of the UE in unit of dBm per unit frequency,
PilotPSD is the pilot power of the UE in unit of dBm per unit frequency,
TtoP is the traffic-to-pilot ratio for the UE,
maxTtoP is a maximum TtoP value in units of dB, and
minTtoP is a minimum TtoP value in units of dB.

The pilot PSD may be based on the transmit power for pilot, channel quality indicator (CQI), or some other transmission sent by the UE to the serving Node B. TtoP may be determined based on the difference between the transmit PSD and the pilot PSD, or TtoP=TxPSD−PilotPSD.

In lines 10 to 50 of the pseudo code, the TtoP is decreased by Δ if the overloading indicator from the strongest neighbor Node B (BS1) is received and is increased by Δ if the overloading indicator is not received. In lines 60 and 70, the TtoP is constrained to be within a range of maxTtoP to minTtoP, which may be fixed or configurable values. In line 80, the transmit PSD is determined as the pilot PSD plus the TtoP.

Figure 3A:
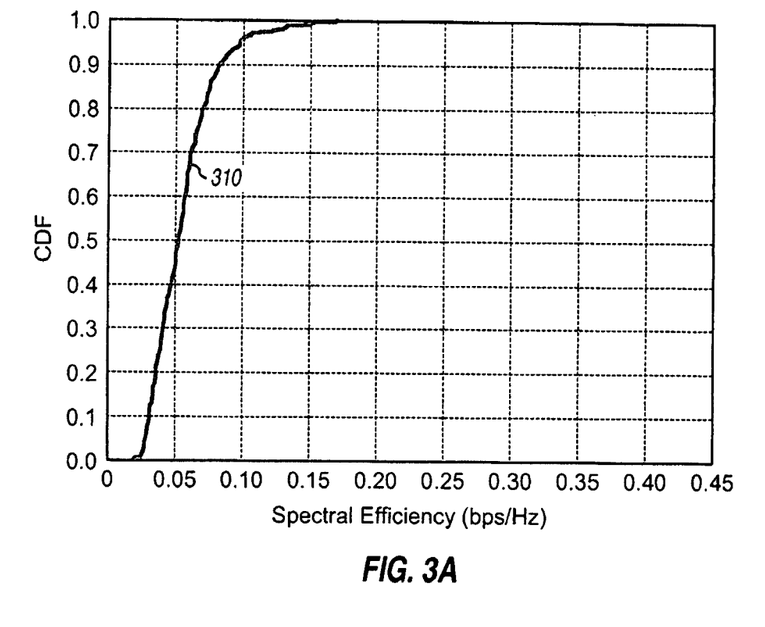
FIG. 3A shows a fairness curve for a symmetric power control scheme.

FIG. 3A shows a fairness curve for the symmetric power control scheme with equal up and down step sizes. The performance of a system with a bandwidth of 5 MHz was simulated. For the simulation, the step size Δ is 0.5 dB. A plot 310 shows cumulative density function (CDF) of spectral efficiency for UEs using the symmetric power control scheme. The average cell throughput is 2.825 Mbps, which gives a spectral efficiency of about 0.565 bps/Hz.

Figure 3B:
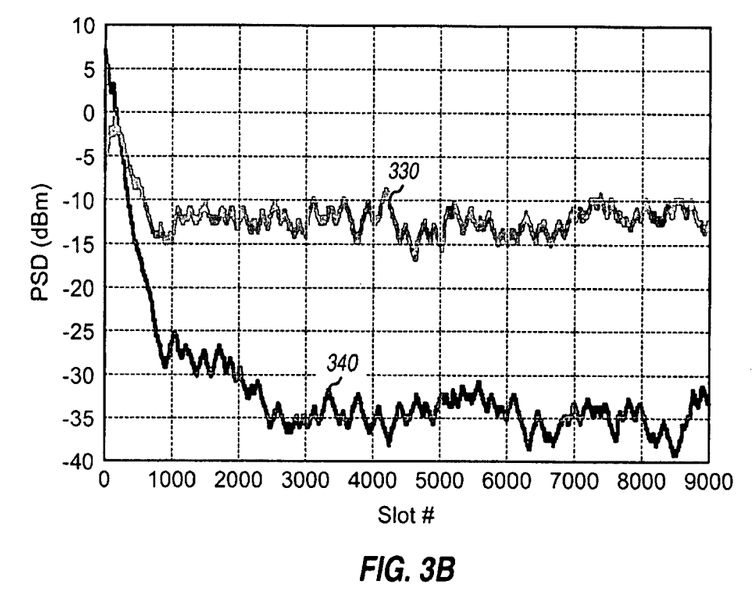
FIG. 3B shows adaptation behavior of transmit PSD levels of two UEs.

FIG. 3B shows adaptation behavior of the transmit PSD levels of two UEs. A plot 330 shows transmit PSD versus time (in units of slot) for a UE with geometry of 15 dB. A plot 340 shows transmit PSD versus time for a UE with geometry of −5 dB. Although not shown in FIG. 3B, the pilot PSD for each UE wanders in similar manner as the transmit PSD for that UE. As a result, the TtoP of each UE bounces around 0 dB. The intra-cell power control by the serving Node B maintains the uplink SINR of a reference transmission (e.g., uplink CQI) near a common level of 2 dB. As a result, each UE has similar received SINR for traffic data at the serving Node B, which yields good fairness performance for the two UEs.

As shown by plot 310 in FIG. 3A, the symmetric power control scheme provides a 5-percentile spectral efficiency of 0.029 bps/Hz and cell throughput of 2.825 Mbps (or 0.565 bps/Hz). It may be desirable to trade off the 5-percentile spectral efficiency with cell throughput.

In an aspect, an asymmetric power control scheme uses different adjustment step sizes in order to trade off low percentile spectral efficiency with cell throughput. In one design, the asymmetric power control scheme employs the following parameters:

DLSINR_Diff_Th—a threshold for downlink SINR difference,
Δ1—PSD adjustment step size 1, and
Δ2—PSD adjustment step size 2, where Δ1>Δ2.

In one design, the downlink SINR difference is the difference between the SINR of the serving Node B and the SINR of the strongest neighbor Node B. A large downlink SINR difference may indicate that a UE is located closer to its serving Node B and thus observes good channel conditions. Conversely, a small downlink SINR difference may indicate that a UE is located near the coverage edge of its serving Node B and thus observes poor channel conditions Pseudo code for transmit PSD adjustment for a given UE in accordance with the asymmetric power control scheme may be as follows:

```
110     if [{DLSINR(BS0)−DLSINR(BS1)}>DLSINR_Diff_Th]
120         Δup = Δ1;
130         Δdown = Δ2;
140     else
150         Δup = Δ2;
160         Δdown = Δ1;
```

```
170    end if
210    if (BS1 is overloaded)
220        TtoP = TtoP – Δdown;
230    else
240        TtoP = TtoP + Δup;
250    end if
260    if (TtoP > maxTtoP) TtoP = maxTtoP;
270    if (TtoP < minTtoP) TtoP = minTtoP;
280    TxPSD = PilotPSD + TtoP;
```

In lines 110 to 130 of the pseudo code above, a larger up step and a smaller down step are used if the downlink SINR of the serving Node B (BS0) is greater than the downlink SINR of the strongest neighbor Node B (BS1) by the downlink SINR difference threshold. Otherwise, in lines 140 to 160, a smaller up step and a larger down step are used if the downlink SINR of the serving Node B is not greater than the downlink SINR of the strongest neighbor Node B by the downlink SINR difference threshold.

In lines 210 to 250, the TtoP is decreased by Δdown if an overloading indicator from the strongest neighbor Node B is received and is increased by Δup if the overloading indicator is not received. In lines 260 and 270, the TtoP is constrained to be within the range of maxTtoP to minTtoP. In line 280, the transmit PSD is determined as the pilot PSD plus the TtoP.

Figure 4A:
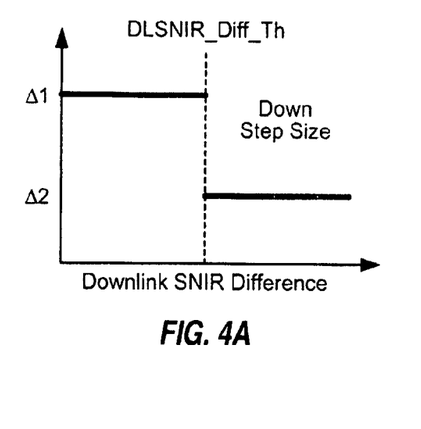
FIGS. 4A and 4B show down and up step sizes for asymmetric power control.
Figure 4B:
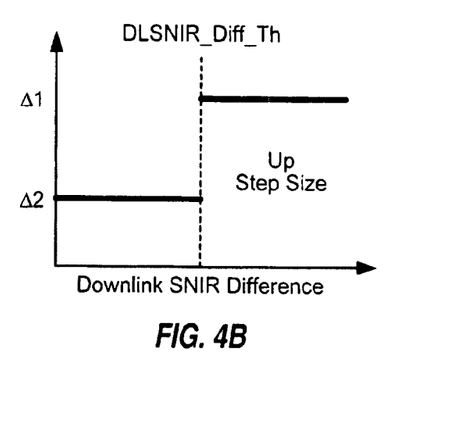

FIGS. 4A and 4B illustrate the down and up step sizes for the asymmetric power control scheme. In FIG. 4A, a larger down step of Δ1 is used when the downlink SINR difference is less than the threshold, and a smaller down step of Δ2 is used when the downlink SINR difference is greater than the threshold. In FIG. 4B, a smaller up step of Δ2 is used when the downlink SINR difference is less than the threshold, and a larger up step of Δ1 is used when the downlink SINR difference is greater than the threshold.

The asymmetric power control scheme exploits asymmetric adjustment step sizes for UEs with different channel conditions (which may be quantified by downlink SINR differences between the serving Node B and the strongest neighbor Node B) to improve performance. The asymmetry may allow UEs with large geometry or higher SINRs to operate with higher transmit PSD. These UEs are typically closer to the serving Node B and may thus cause less interference to the neighbor Node Bs. Cell throughput may improve by allowing these UEs to operate with higher transmit PSD. Conversely, UEs with small geometry or lower SINRs may operate with lower transmit PSD. These UEs may be located at or near the coverage edge of the serving Node B and may cause more interference to the neighbor Node Bs. Inter-cell interference may be reduced by having these UEs operate with lower transmit PSD.

The downlink SINR difference threshold and the adjustment step sizes may be selected in various manners. In one design, a CDF of downlink SINR difference may be determined for a large number of UEs. The downlink SINR difference threshold may then be selected based on the downlink SINR difference for a particular percentile of UEs. For example, the downlink SINR difference threshold may be set to the downlink SINR difference (e.g., DLSINR_Diff=10 dB) observed by 65-percentile UEs. In this case, the spectral efficiency of the top 35% of the UEs (e.g., with DLSINR_Diff≧10 dB) may be improved with asymmetric step sizes.

Figure 5:
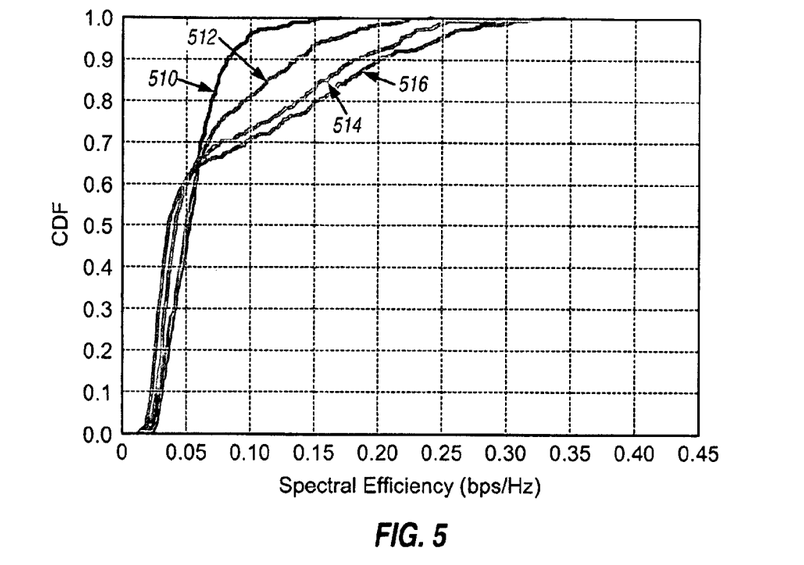
FIG. 5 shows fairness curves for an asymmetric power control scheme with different step sizes.

FIG. 5 shows fairness curves for the symmetric and asymmetric power control schemes. The performance of a system with a bandwidth of 5 MHz was simulated. For the simulation of the asymmetric power control scheme, the downlink SINR difference threshold is 10 dB, and 35% of the UEs observe downlink SINR difference of 10 dB or more.

A plot 510 shows the CDF of spectral efficiency for UEs with symmetric/equal up and down step sizes of Δ1=0.5 dB and Δ2=0.5 dB. Plot 510 may be considered as a baseline plot and a reference for comparison. A plot 512 shows the CDF of spectral efficiency for UEs with asymmetric up and down step sizes of Δ1=0.6 dB and Δ2=0.5 dB. A plot 514 shows the CDF of spectral efficiency with Δ1=0.8 dB and Δ2=0.5 dB. A plot 516 shows the CDF of spectral efficiency with Δ1=1.0 dB and Δ2=0.5 dB. Table 1 summarizes the results for the symmetric power control scheme as well as the asymmetric power control scheme with different amounts of asymmetry.

TABLE 1

| (Δ1, Δ2) | Cell Throughput (5 MHz Bandwidth) | 5% Spectral Efficiency (bps/Hz) |
|---|---|---|
| (0.5, 0.5) | 2.825 Mbps, 0.565 bps/Hz | 0.029 |
| (0.6, 0.5) | 3.395 Mbps, 0.679 bps/Hz | 0.028 |
| (0.8, 0.5) | 3.859 Mbps, 0.772 bps/Hz | 0.025 |
| (1.0, 0.5) | 4.071 Mbps, 0.814 bps/Hz | 0.021 |

For the fairness curves shown in FIG. 5, the simulation was performed with the downlink SINR difference threshold set to the downlink SINR difference for 65-percentile UEs. Hence, plots 510, 512, 514 and 516 intersect at the 65-percentile. Different fairness curves may be obtained for different downlink SINR difference thresholds. Furthermore, the results in Table 1 are obtained with maxTtoP=10 dB and minTtoP=–4 dB. Different cell throughputs and spectral efficiencies may be obtained with other values for the various parameters used for power control.

In general, with asymmetric step sizes, UEs with high geometry may transmit at higher PSD and may thus increase their throughput noticeably. As a result, the cell throughput may improve. The 5-percentile spectral efficiency drops when the cell throughput rises. The TtoP of UEs with large downlink SINR differences is pushed towards maxTtoP whereas the TtoP of UEs with small downlink SINR differences is dragged towards minTtoP. The amount of asymmetry, which is Δ1-Δ2, determines the rate at which the TtoP moves towards maxTtoP or minTtoP. A larger Δ1-Δ2 corresponds to a faster rising or falling rate for TtoP, and the converse is true for a smaller Δ1-Δ2.

Simulations indicate that the initial system setting does not affect the final system performance in equilibrium for the asymmetric power control scheme. Different initial values may be used for TtoP and pilot PSD. The transmit PSD converges to an equilibrium value, e.g., as shown in FIG. 3B. The adaptation of the transmit PSD under different initial TtoP and pilot PSD values is well behaved. The equilibrium performance of the asymmetric power control scheme is independent of the initial setting.

For clarity, an asymmetric power control scheme with two different step sizes has been described above. This asymmetric power control scheme employs three parameters, which are the large step size Δ1, the small step size Δ2, and the downlink SINR difference threshold. The downlink SINR difference threshold determines which UEs will have their spectral efficiencies improved. The amount of asymmetry, which is Δ1-Δ2, determines the amount of tradeoff between low-percentile spectral efficiency and cell throughput.

In general, an asymmetric power control scheme may employ any number of step sizes, any step size value, and any set of downlink SINR difference thresholds. The asymmetric power control scheme may have multiple (N) downlink SINR difference thresholds and N+1 step sizes, which may be given as follows:

N downlink SINR difference thresholds: $Th1 > Th2 > \ldots > ThN$, and

N+1 step sizes: $\Delta 1 > \Delta 2 > \ldots > \Delta N > \Delta N+1$.

In general, N may be any integer value greater than one.

Figure 6A:
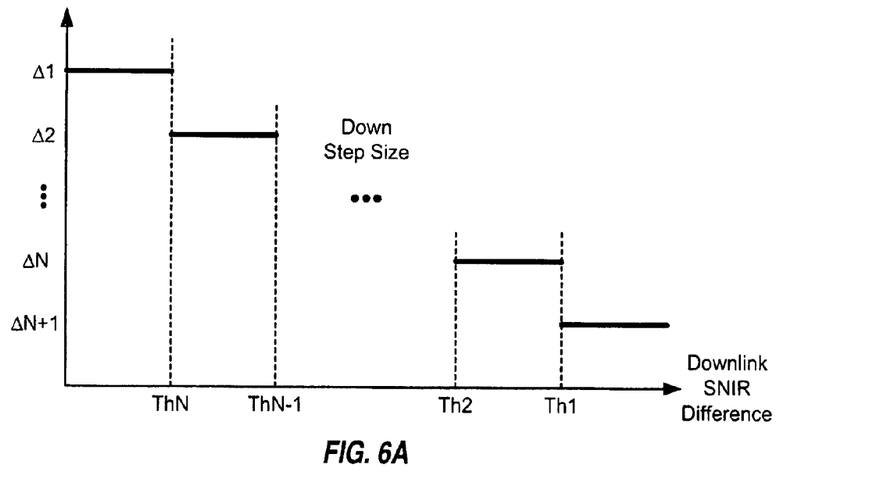
FIGS. 6A and 6B show use of multiple down and up step sizes.
Figure 6B:
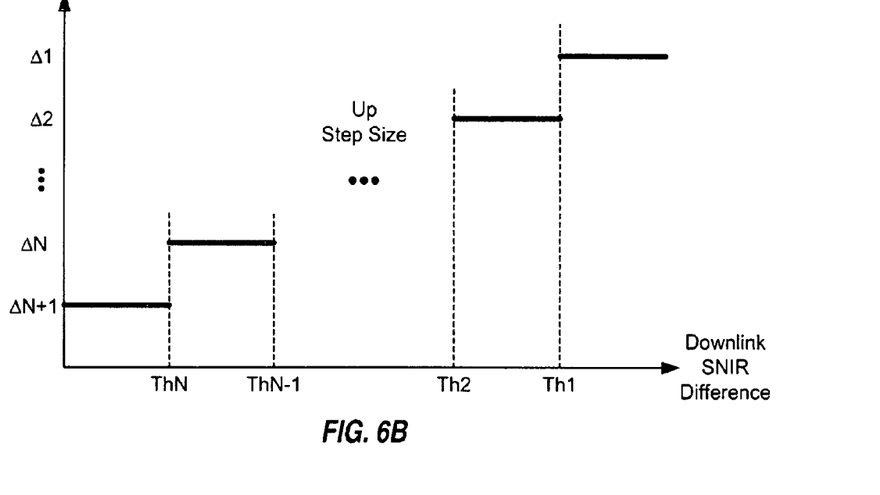

FIGS. 6A and 6B illustrate the down and up step sizes for an asymmetric power control scheme with N+1 different step sizes. In FIG. 6A, the largest down step of $\Delta 1$ is used when the downlink SINR difference is less than the lowest threshold of ThN, the second largest down step of $\Delta 2$ is used when the downlink SINR difference is between ThN and ThN-1, and so on, and the smallest down step of $\Delta N+1$ is used when the downlink SINR difference is greater than the highest threshold of Th1.

In FIG. 6B, the smallest up step of $\Delta N+1$ is used when the downlink SINR difference is less than the lowest threshold of ThN, the second smallest up step of $\Delta N$ is used when the downlink SINR difference is between ThN and ThN-1, and so on, and the largest up step of $\Delta 1$ is used when the downlink SINR difference is greater than the highest threshold of Th1.

In general, more downlink SINR difference thresholds and more step sizes may provide more degrees of freedom, which may allow for more control over the tradeoff between fairness among UEs and cell throughput, e.g., as shown in FIG. 5.

In another design, the up step size is fixed (e.g., set to 0.5 dB), and the down step size is configurable and may be selected, e.g., based on the downlink SINR difference. For example, the down step size may be (i) larger than the up step size if the downlink SINR difference is less than the downlink SINR difference threshold and (ii) equal to or smaller than the up step size if the downlink SINR difference is equal to or greater than the downlink SINR difference threshold.

In yet another design, the down step size is fixed (e.g., set to 0.5 dB), and the up step size is configurable and may be selected, e.g., based on the downlink SINR difference. For example, the up step size may be (i) larger than the down step size if the downlink SINR difference is greater than the downlink SINR difference threshold and (ii) equal to or smaller than the down step size if the downlink SINR difference is equal to or less than the downlink SINR difference threshold.

In the design of the asymmetric power control scheme given by the pseudo code above, the TtoP is (i) decreased by $\Delta$down if an overloading indicator from the strongest neighbor Node B is received or (ii) increased by $\Delta$up if the overloading indicator is not received. The TtoP is thus adjusted either up or down in each update interval based on whether or not the overloading indicator from the strongest neighbor Node B is received. The values of $\Delta$down and $\Delta$up are asymmetric and used to trade off low-percentile spectral efficiency with cell throughput.

In another design of the asymmetric power control scheme, the TtoP may be (i) decreased by $\Delta$down with a probability of Pdown if an overloading indicator from the strongest neighbor Node B is received or (ii) increased by $\Delta$up with a probability of Pup if the overloading indicator is not received. In one design, $\Delta$down and $\Delta$up have the same value of $\Delta$, and Pdown and Pup have different values. In this design, a higher probability P1 and a lower probability P2 may be selected, and Pdown and Pup may be set to P1 and P2 in the same manner that $\Delta$down and $\Delta$up are set to $\Delta 1$ and $\Delta 2$. In particular, Pdown may be set to P1 if the downlink SINR difference is less than the downlink SINR difference threshold or to P2 otherwise. Pup may be set to P2 if the downlink SINR difference is less than the downlink SINR difference threshold or to P1 otherwise. In each update interval, a random value between 0 and 1.0 may be selected. TtoP may then be (i) decreased by $\Delta$ if the random value is less than Pdown and an overloading indicator is received or (ii) increased by $\Delta$ if the random value is less than Pup and the overloading indicator is not received. In another design, a combination of asymmetric $\Delta$down and $\Delta$up as well as asymmetric Pdown and Pup may be used for power control.

In general, an asymmetric power control scheme may use only configurable up step size, only configurable down step size, both configurable up and down step sizes, only configurable up probability, only configurable down probability, both configurable up and down probabilities, or any combination thereof. The configurable step sizes and/or probabilities may be selected based on measurements for any number of Node Bs and any Node B, e.g., based on measurements for only the serving Node B, for the serving Node B and the strongest neighbor Node B, for only the neighbor Node Bs, etc. The configurable step sizes and/or probabilities may also be selected based on any type of measurements such as downlink SINR, received pilot power, received pilot strength, etc.

Figure 7A:
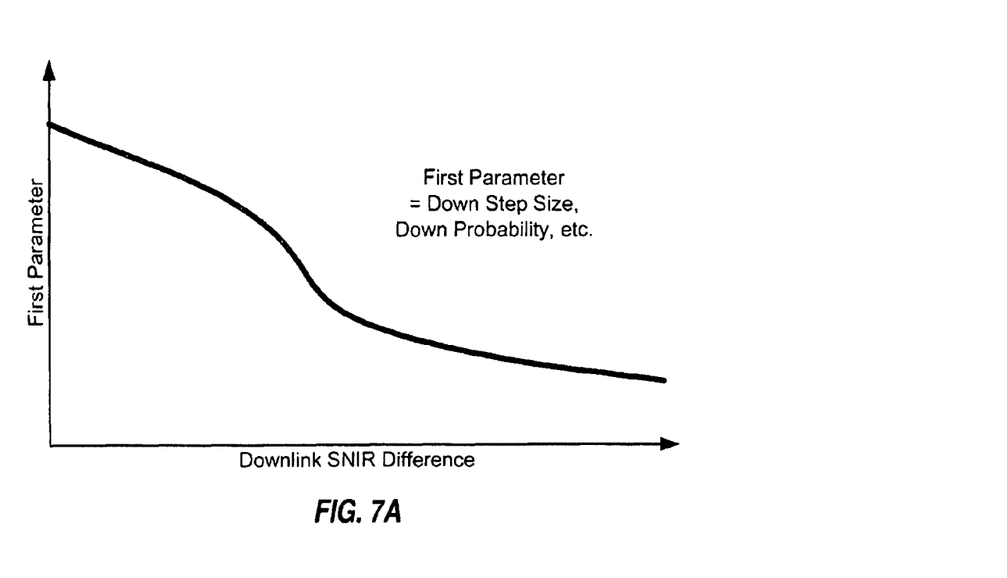
FIGS. 7A and 7B show two parameters for asymmetric power control.
Figure 7B:
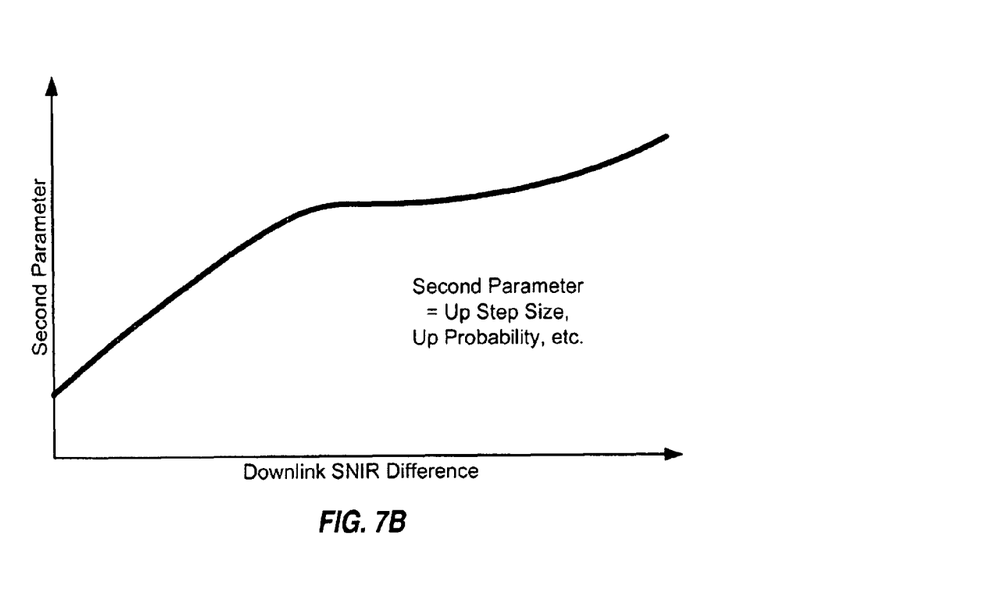

FIGS. 7A and 7B illustrate two parameters for an asymmetric power control scheme. In FIG. 7A, a first parameter is used for decreasing transmit power and may be defined based on any function, which may be dependent on the system need. The first parameter may be for down step size, down probability, minimum TtoP value, etc. The first parameter may be a function of downlink SINR difference, as shown in FIG. 7A, or some the quantity. In FIG. 7B, a second parameter is used for increasing transmit power and may be defined based on any function, which may be dependent on the system need. The second parameter may be for up step size, up probability, maximum TtoP value, etc. The second parameter may be a function of downlink SINR difference, as shown in FIG. 7B, or some the quantity.

Figure 8:
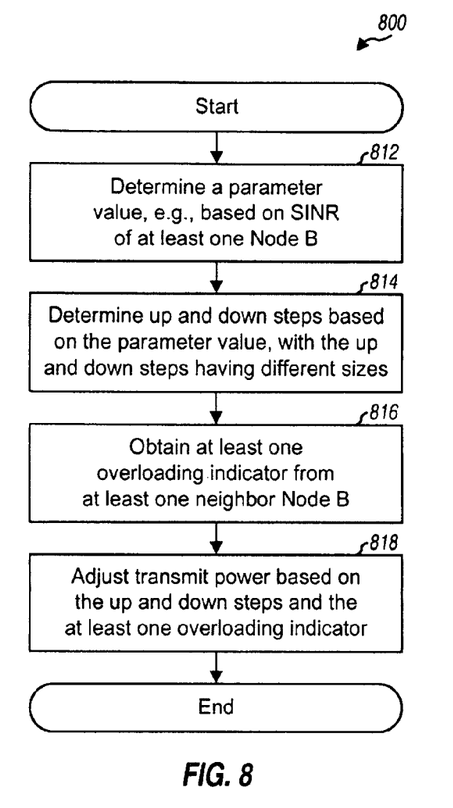
FIG. 8 shows a process for adjusting transmit power.

FIG. 8 shows a design of a process 800 for adjusting transmit power by a UE. A parameter value may be determined based on SINR or received power of a reference signal of at least one Node B (block 812). In one design, the parameter value is the difference between an SINR of a serving Node B and an SINR for a strongest neighbor Node B.

Up and down steps may be determined based on the parameter value, with the up and down steps having different sizes (block 814). A first step size for the up step and a second step size for the down step may be selected if the parameter value is greater than a threshold, e.g., if the downlink SINR difference is greater than a downlink SINR difference threshold. Alternatively, the first step size for the down step and the second step size for the up step may be selected if the parameter value is less than or equal to the threshold. The up step may also be set to one of a plurality of step sizes based on the parameter value and at least one threshold, and the down step may be set to another one of the plurality of step sizes based on the parameter value and at least one threshold.

At least one overloading indicator from at least one neighbor Node B may be obtained, e.g., received from the serving Node B and/or neighbor Node Bs (block 816). The transmit power may be adjusted based on the up and down steps and the at least one overloading indicator (block 818). In one design, the transmit power may be (i) increased by the up step if an overloading indicator from at least one designated Node B is not received or (ii) decreased by the down step if the overloading indicator is received. The designated Node B may be the strongest neighbor Node B or some other Node B. In another design, a traffic-to-pilot ratio (TtoP) may be adjusted based on the up and down steps and the at least one overloading indicator. The transmit power may then be adjusted based on the TtoP and a reference power level, which may be varied based on TPC commands received from the serving Node B. In both designs, the transmit power may be limited to within a maximum value and a minimum value. The transmit power may be given by a transmit PSD, e.g., for an OFDMA or SC-FDMA system.

Figure 9:
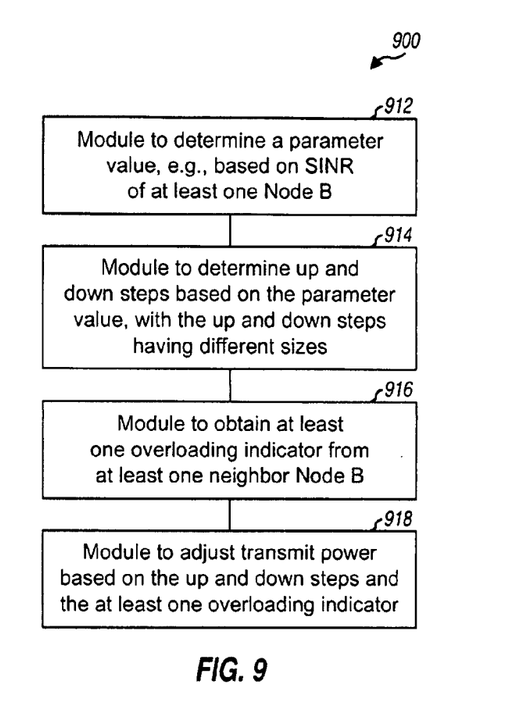
FIG. 9 shows an apparatus for adjusting transmit power.

FIG. 9 shows a design of an apparatus 900 for adjusting transmit power. Apparatus 900 includes means for determining a parameter value based on SINR or received power of a reference signal of at least one Node B (module 912), means for determining up and down steps based on the parameter value, with the up and down steps having different sizes (module 914), means for obtaining at least one overloading indicator from at least one neighbor Node B (module 916), and means for adjusting the transmit power based on the up and down steps and the at least one overloading indicator (module 918).

Figure 10:
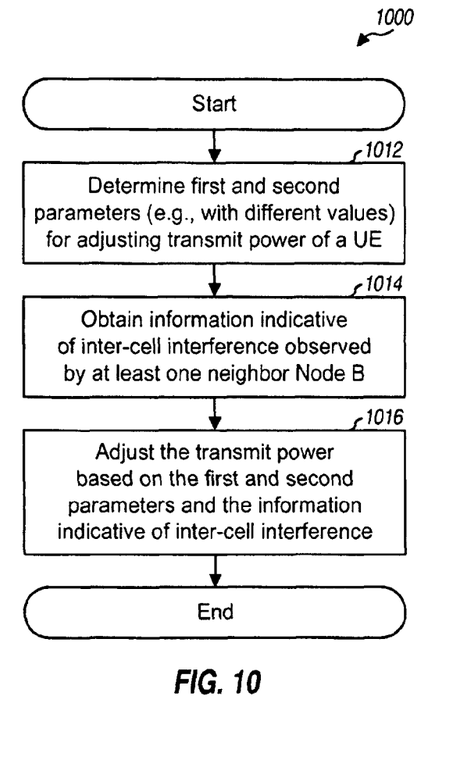
FIG. 10 shows another process for adjusting transmit power.

FIG. 10 shows a design of a process 1000 adjusting transmit power by a UE. First and second parameters for adjusting the transmit power of the UE may be determined, e.g., based on SINR or received power of a reference signal of at least one Node B, at least one threshold for the SINR or received power, etc. (block 1012). The first and second parameters may have different values and may be used for asymmetric adjustment of the transmit power of the UE. In one design, the first parameter may correspond to a down step and the second parameter may correspond to an up step, with the down and up steps having different sizes. In another design, the first parameter may correspond to a first probability of decreasing the transmit power and the second parameter may correspond to a second probability of increasing the transmit power, with the first probability being different from the second probability.

Information indicative of inter-cell interference observed by at least one neighbor Node B may be obtained (block 1014). This information may comprise overloading indicator and/or other type of information. The transmit power of the UE may be adjusted based on the first and second parameters and the information indicative of inter-cell interference (block 1016). In one design, the transmit power may be decreased based on the first parameter (e.g., the down step size and/or the first probability) if the information indicates excessive inter-cell interference. The transmit power may be increased based on the second parameter (e.g., the up step size and/or the second probability) if the information indicates lack of excessive inter-cell interference.

Figure 11:
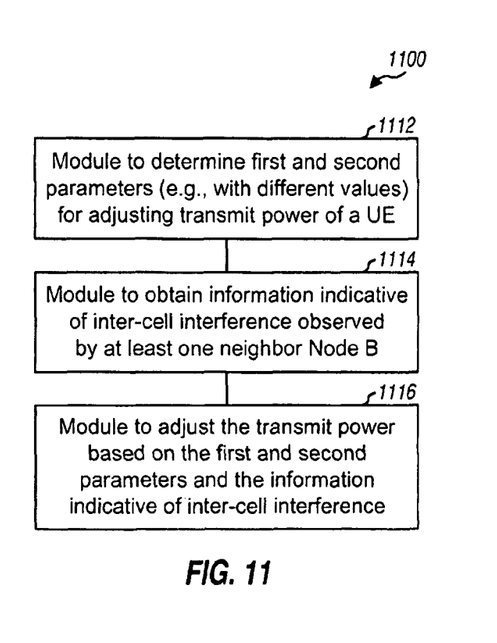
FIG. 11 shows another apparatus for adjusting transmit power.

FIG. 11 shows a design of an apparatus 1100 for adjusting transmit power. Apparatus 1100 includes means for determining first and second parameters (e.g., of different values) for adjusting transmit power (module 1112), means for obtaining information indicative of inter-cell interference observed by at least one neighbor Node B (module 1114), and means for adjusting the transmit power based on the first and second parameters and the information indicative of inter-cell interference (module 1116).

The modules in FIGS. 9 and 11 may comprise processors, electronics devices, hardware devices, electronics components, logical circuits, memories, etc., or any combination thereof.

Figure 12:
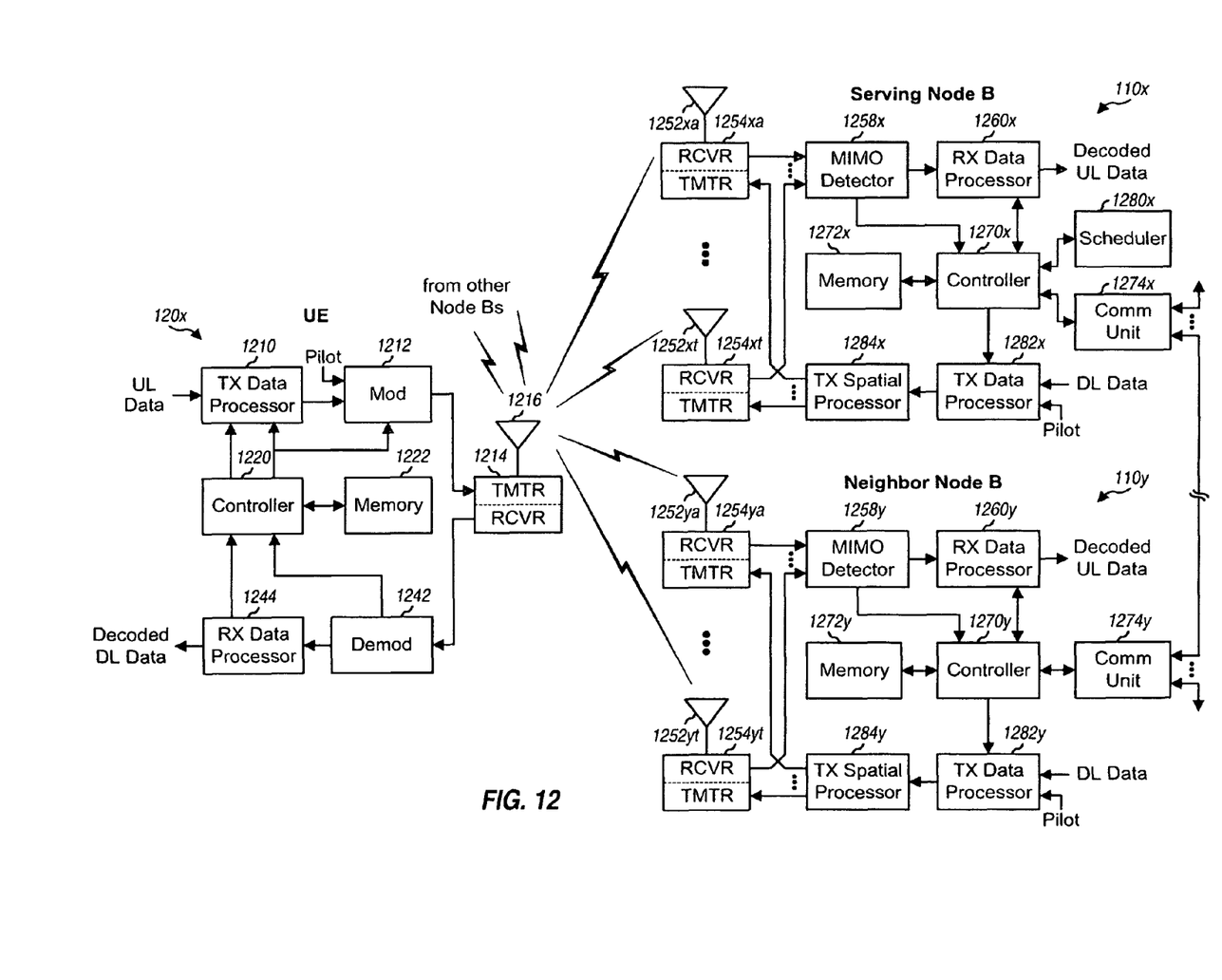
FIG. 12 shows a block diagram of a UE and two Node Bs.

FIG. 12 shows a block diagram of a design of UE 120x, serving Node B 110x, and neighbor Node B 110y. On the uplink, at UE 120x, a TX data processor 1210 may process (e.g., encode, interleave, and symbol map) traffic data and signaling and provide data symbols. A modulator (Mod) 1212 may process the data symbols and pilot symbols (e.g., for OFDM, SC-FDM, CDMA, etc.) and provide output chips. A transmitter (TMTR) 1214 may condition (e.g., convert to analog, amplify, filter, and upconvert) the output chips and generate an uplink signal, which may be transmitted via an antenna 1216.

At serving Node B 110x, multiple antennas 1252xa through 1252xt may receive the uplink signals from UE 120x and other UEs. Each antenna 1252x may provide a received signal to a respective receiver (RCVR) 1254x. Each receiver 1254x may condition (e.g., filter, amplify, downconvert, and digitize) its received signal, perform demodulation (e.g., for OFDM, SC-FDM, CDMA, etc.), and provide received symbols. A MIMO detector 1258 may perform MIMO detection on the received symbols from all receivers and provide data symbol estimates. A receive (RX) data processor 1260x may process (e.g., symbol demap, deinterleave, and decode) the data symbol estimates and provide decoded data for UE 120x and other UEs currently served by Node B 110x.

The processing for a downlink transmission may be similar to that described above for the uplink. The processing for the transmissions on the downlink and uplink is typically specified by the system.

For interference and power control, at serving Node B 110x, MIMO detector 1258x may estimate the received SINR for UE 120x, estimate the inter-cell interference observed by Node B 110x, and provide the received SINR of UE 110x and an interference estimate to a controller 1270x. Controller 1270x may generate TPC commands for UE 120x based on the received SINR of the UE and the target SINR. Controller 1270x may generate an overloading indicator based on the interference estimate. Controller 1270x may also receive overloading indicators from neighbor Node Bs via a communication (Comm) unit 1274x. The TPC commands, the overloading indicator from Node B 110x, and possibly the overloading indicators from neighbor Node Bs may be processed by a TX data processor 1282x and a TX spatial processor 1284x, conditioned by transmitters 1254xa through 1254xt, and transmitted via antennas 1252xa through 1252xt. The overloading indicator from Node B 110x may be sent to the neighbor Node Bs via communication unit 1274x for transmission by the neighbor Node Bs.

At neighbor Node B 110y, a MIMO detector 1258y may estimate the inter-cell interference observed by Node B 110y and provide an interference estimate to a controller 1270y. Controller 1270y may generate an overloading indicator based on the interference estimate. The overloading indicator may be processed and sent to the UEs in the system. The overloading indicator may also be sent to the neighbor Node Bs via a communication unit 1274y.

At UE 120x, antenna 1216 may receive the downlink signals from the serving and neighbor Node Bs and may provide a received signal to a receiver 1214. The received signal may be conditioned and digitized by receiver 1214 and further processed by a demodulator (Demod) 1242 and an RX data processor 1244. Processor 1244 may provide the TPC commands sent by serving Node B 110x for UE 120x and the overloading indicators sent by the neighbor Node Bs. An SINR estimator within demodulator 1242 may estimate the downlink SINR of each Node B. A controller 1220 may detect the received TPC commands and update the reference power level (e.g., the pilot PSD) based on the TPC decisions. Controller 1220 may also adjust the transmit power (e.g., the transmit PSD) based on the overloading indicators from the neighbor Node Bs and the downlink SINRs of the serving and neighbor Node Bs, e.g., as described above. Controller 1220 may provide the transmit power (e.g., the transmit PSD) to use for uplink transmission. Processor 1210 and/or modulator 1212 may scale the data symbols based on the transmit power provided by controller 1220.

Controllers 1220, 1270x, and 1270y may direct the operation of various processing units at UE 120x and Node Bs 110x and 110y, respectively. These controllers may also perform various functions for interference and power control. For example, controller 1220 may implement any or all of units 242 through 258 shown in FIG. 2 and may perform process 800 in FIG. 8, process 1000 in FIG. 10, and/or other processes for interference and power control. Memory units 1222, 1272x, and 1272y may store data and program codes for UE 120x and Node Bs 110x and 110y, respectively. A scheduler 1280x may schedule UEs for communication with Node B 110x and assign downlink and/or uplink resources to the scheduled UEs.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. An apparatus for wireless communication, comprising:
a processor configured to determine up and down steps based on a parameter value, to obtain at least one indicator from at least one neighbor Node B, and to adjust transmit power based on the up and down steps and the at least one indicator, the up and down steps having different sizes, wherein the processor increases the transmit power by the up step if an indicator from at least one designated Node B is not received, and decreases the transmit power by the down step if the indicator from the at least one designated Node B is received; and
a memory coupled to the processor.

2. The apparatus of claim 1, wherein the processor determines the parameter value based on signal-to-interference-and-noise ratio (SINR) or received power of a reference signal of at least one Node B.

3. The apparatus of claim 1, wherein the processor determines the parameter value based on difference between a signal-to-interference-and-noise ratio (SINR) of a serving Node B and an SINR of a strongest neighbor Node B.

4. The apparatus of claim 1, wherein the processor selects a first step size for the up step and a second step size for the down step if the parameter value is greater than a threshold, and selects the first step size for the down step and the second step size for the up step if the parameter value is less than or equal to the threshold.

5. The apparatus of claim 1, wherein the processor determines a downlink signal-to-interference-and-noise ratio (SINR) difference for a serving Node B and a strongest neighbor Node B as the parameter value, selects a first step size for the up step and a second step size for the down step if the downlink SINR difference is greater than a downlink SINR difference threshold, and selects the first step size for the down step and the second step size for the up step if the downlink SINR difference is less than or equal to the downlink SINR difference threshold, the first step size being larger than the second step size.

6. The apparatus of claim 1, wherein the processor sets the up step to one of a plurality of step sizes based on the parameter value and at least one threshold.

7. The apparatus of claim 1, wherein the processor sets the down step to one of a plurality of step sizes based on the parameter value and at least one threshold.

8. The apparatus of claim 1, wherein the processor sets the up step to one of a plurality of step sizes based on the parameter value and at least one threshold, and sets the down step to another one of the plurality of step sizes based on the parameter value and the at least one threshold.

9. The apparatus of claim 1, wherein the at least one designated Node B comprises a strongest neighbor Node B among the at least one neighbor Node B.

10. The apparatus of claim 1, wherein the processor adjusts a traffic-to-pilot ratio (TtoP) based on the up and down steps and the at least one indicator, and adjusts the transmit power based on the TtoP and a reference power level.

11. The apparatus of claim 10, wherein the processor adjusts the reference power level based on transmit power control (TPC) commands from a serving Node B.

12. The apparatus of claim 1, wherein the processor limits the transmit power to within a maximum value and a minimum value.

13. The apparatus of claim 1, wherein the transmit power is given by a transmit power spectral density (PSD).

14. A method for wireless communication, comprising:
determining up and down steps based on a parameter value, the up and down steps having different sizes;
obtaining at least one indicator from at least one neighbor Node B; and
adjusting transmit power based on the up and down steps and the at least one indicator,
wherein adjusting the transmit power comprises increasing the transmit power by the up step if an indicator from at least one designated Node B is not received, and decreasing the transmit power by the down step if the indicator from the at least one designated Node B is received.

15. The method of claim 14, further comprising:
determining the parameter value based on difference between a signal-to-interference-and-noise ratio (SINR) of a serving Node B and an SINR of a strongest neighbor Node B.

16. The method of claim 14, wherein the determining the up and down steps comprises
selecting a first step size for the up step and a second step size for the down step if the parameter value is greater than a threshold, and
selecting the first step size for the down step and the second step size for the up step if the parameter value is less than or equal to the threshold.

17. An apparatus for wireless communication, comprising:
means for determining up and down steps based on a parameter value, the up and down steps having different sizes;
means for obtaining at least one indicator from at least one neighbor Node B; and
means for adjusting transmit power based on the up and down steps and the at least one indicator,
wherein the means for adjusting the transmit power comprises increasing the transmit power by the up step if an indicator from at least one designated Node B is not received, and decreasing the transmit power by the down step if the indicator from the at least one designated Node B is received.

18. The apparatus of claim 17, further comprising:
means for determining the parameter value based on difference between a signal-to-interference-and-noise ratio (SINR) of a serving Node B and an SINR of a strongest neighbor Node B.

19. The apparatus of claim 17, wherein the means for determining the up and down steps comprises
means for selecting a first step size for the up step and a second step size for the down step if the parameter value is greater than a threshold, and
means for selecting the first step size for the down step and the second step size for the up step if the parameter value is less than or equal to the threshold.

20. A machine-readable medium comprising instructions which, when executed by a machine, cause the machine to perform operations including:
determining up and down steps based on a parameter value, the up and down steps having different sizes;
obtaining at least one indicator from at least one neighbor Node B; and
adjusting transmit power based on the up and down steps and the at least one indicator,
wherein adjusting the transmit power comprises increasing the transmit power by the up step if an indicator from at least one designated Node B is not received, and decreasing the transmit power by the down step if the overloading indicator from the at least one designated Node B is received.

21. An apparatus for wireless communication, comprising:
a processor configured to determine first and second parameters for adjusting transmit power of a user equipment (UE), to obtain information indicative of inter-cell interference observed by at least one neighbor Node B, and to adjust the transmit power based on the first and second parameters and the information indicative of inter-cell interference, wherein the first parameter is associated with decreasing transmit power and the second parameter is associated with increasing the transmit power, and further wherein the first and second parameters have different values for asymmetric adjustment of the transmit power of the UE; and
a memory coupled to the processor.

22. The apparatus of claim 21, wherein the first parameter corresponds to a down step and the second parameter corresponds to an up step, the down and up steps having different sizes, and wherein the processor adjusts the transmit power based on the down and up steps.

23. The apparatus of claim 21, wherein the first parameter corresponds to a first probability of decreasing the transmit power and the second parameter corresponds to a second probability of increasing the transmit power, the first probability being different from the second probability, and wherein the processor adjusts the transmit power based on the first and second probabilities.

24. The apparatus of claim 21, wherein the processor determines the first and second parameters based on signal-to-interference-and-noise ratio (SINR) or received power of a reference signal of at least one Node B.

25. The apparatus of claim 24, wherein the processor determines the first and second parameters based further on at least one threshold for the SINR or received power of the reference signal.

26. The apparatus of claim 21, wherein the processor decreases the transmit power based on the first parameter if the information indicates excessive inter-cell interference, and increases the transmit power based on the second parameter if the information indicates lack of excessive inter-cell interference.

27. A method for wireless communication, comprising:
determining first and second parameters for adjusting transmit power of a user equipment (UE);
obtaining information indicative of inter-cell interference observed by at least one neighbor Node B; and
adjusting the transmit power based on the first and second parameters and the information indicative of inter-cell interference, wherein the first parameter is associated with decreasing transmit power and the second parameter is associated with increasing the transmit power, and further wherein the first and second parameters have different values for asymmetric adjustment of the transmit power of the UE.

28. The method of claim 27, wherein the first parameter corresponds to a down step and the second parameter corresponds to an up step, the down and up steps having different sizes, and wherein the adjusting the transmit power comprises adjusting the transmit power based on the down and up steps.

29. The method of claim 27, wherein the first parameter corresponds to a first probability of decreasing the transmit power and the second parameter corresponds to a second probability of increasing the transmit power, the first probability being different from the second probability, and wherein the adjusting the transmit power comprises adjusting the transmit power based on the first and second probabilities.

30. An apparatus for wireless communication, comprising:
means for determining first and second parameters for adjusting transmit power of a user equipment (UE);
means for obtaining information indicative of inter-cell interference observed by at least one neighbor Node B; and
means for adjusting the transmit power based on the first and second parameters and the information indicative of inter-cell interference, wherein the first parameter is associated with decreasing transmit power and the second parameter is associated with increasing the transmit power, and further wherein the first and second parameters have different values for asymmetric adjustment of the transmit power of the UE.

31. The apparatus of claim 30, wherein the first parameter corresponds to a down step and the second parameter corresponds to an up step, the down and up steps having different sizes, and wherein the means for adjusting the transmit power comprises means for adjusting the transmit power based on the down and up steps.

32. The apparatus of claim 30, wherein the first parameter corresponds to a first probability of decreasing the transmit power and the second parameter corresponds to a second probability of increasing the transmit power, the first probability being different from the second probability, and wherein the means for adjusting the transmit power comprises means for adjusting the transmit power based on the first and second probabilities.

* * * * *